(12) United States Patent
Misani et al.

(10) Patent No.: US 11,077,712 B2
(45) Date of Patent: Aug. 3, 2021

(54) TYRE FOR BICYCLE WHEELS

(71) Applicant: PIRELLI TYRE S.P.A., Milan (IT)

(72) Inventors: Pierangelo Misani, Milan (IT); Paolo Brivio, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 219 days.

(21) Appl. No.: 15/768,827

(22) PCT Filed: Oct. 28, 2016

(86) PCT No.: PCT/IB2016/056498
§ 371 (c)(1),
(2) Date: Apr. 16, 2018

(87) PCT Pub. No.: WO2017/072708
PCT Pub. Date: May 4, 2017

(65) Prior Publication Data
US 2018/0304690 A1    Oct. 25, 2018

(30) Foreign Application Priority Data

Oct. 30, 2015  (IT) .......................... UB2015A005002
Aug. 3, 2016   (IT) .......................... UA2016A005767

(51) Int. Cl.
*B60C 9/06*     (2006.01)
*B60C 9/22*     (2006.01)
(Continued)

(52) U.S. Cl.
CPC .............. *B60C 9/06* (2013.01); *B60C 9/2204* (2013.01); *B60C 11/033* (2013.01); *B60C 11/11* (2013.01);
(Continued)

(58) Field of Classification Search
CPC ... B60C 9/06; B60C 2200/12; B60C 2200/14; B60C 2001/0066; B60C 2009/0092; B60C 2009/0085; B60C 2009/0246
See application file for complete search history.

(56) References Cited

U.S. PATENT DOCUMENTS

| 4,649,979 A | 3/1987 | Kazusa et al. |
| 9,010,389 B2 | 4/2015 | Matsunami |

(Continued)

FOREIGN PATENT DOCUMENTS

| CN | 2093777 U | 1/1992 |
| CN | 1222457 A | 7/1999 |

(Continued)

OTHER PUBLICATIONS

Dunlop D404 Rear Motorcycle Tire 150/80B-16 (71H) Black Wall, https://www.amazon.com/Dunlop-D404-Motorcycle-80B-16-Black/dp/B001KPRHE6/ref=sr_1_2?dchild=1&keywords=motorcycle+tire&qid=1585083457&s=automotive&sr=1-2, Jan. 30, 2007 (Year: 2007).*

(Continued)

*Primary Examiner* — Robert C Dye
*Assistant Examiner* — Farah Taufiq
(74) *Attorney, Agent, or Firm* — Steinfl + Bruno LLP

(57) ABSTRACT

A tyre for bicycle wheels, having a carcass structure, a belt layer arranged in a radially outer position with respect to the carcass structure and a tread band arranged in a radially outer position with respect to the belt layer. The carcass structure has a carcass ply engaged with a pair of annular anchoring structures and including a plurality of reinforcing cords. The cords are inclined, with respect to an equatorial plane of the tyre, at a first angle between about 65° and about 90°. The belt layer has a reinforcing cord wound onto the carcass structure according to a winding direction oriented, (Continued)

with respect to the equatorial plane, at a second angle between about 0° and about 30°.

23 Claims, 7 Drawing Sheets

(51) Int. Cl.
*B60C 11/03* (2006.01)
*B60C 11/11* (2006.01)

(52) U.S. Cl.
CPC ...... *B60C 2200/12* (2013.01); *B60C 2200/14* (2013.01)

(56) References Cited

U.S. PATENT DOCUMENTS

| | | | |
|---|---|---|---|
| 9,975,382 B2 | 5/2018 | Kubo | |
| 2003/0047261 A1* | 3/2003 | Matsumura | B60C 11/0318 152/209.2 |
| 2006/0260730 A1* | 11/2006 | Misani | B60C 9/023 152/531 |
| 2008/0035263 A1 | 2/2008 | Nakamura | |
| 2012/0216929 A1* | 8/2012 | Matsunami | B60C 11/0302 152/209.11 |
| 2013/0160915 A1 | 6/2013 | Isaka | |
| 2013/0312883 A1 | 11/2013 | Yang et al. | |
| 2015/0129101 A1 | 5/2015 | Koide et al. | |
| 2016/0107486 A1 | 4/2016 | Bruschelli et al. | |

FOREIGN PATENT DOCUMENTS

| | | | | |
|---|---|---|---|---|
| CN | 2502924 Y | 7/2002 | | |
| CN | 201419615 Y | 3/2010 | | |
| CN | 101730629 A | 6/2010 | | |
| CN | 201881833 U | 6/2011 | | |
| CN | 102470699 A | 5/2012 | | |
| CN | 102582369 A | 7/2012 | | |
| CN | 103171373 A | 6/2013 | | |
| CN | 104470731 A | 3/2015 | | |
| CN | 104508194 A | 4/2015 | | |
| DE | 2162546 A1 | 6/1973 | | |
| DE | 102004023970 A1 | 12/2005 | | |
| DE | 102004023970 A1 * | 12/2005 | ........... | B60C 9/0207 |
| EP | 0484831 A1 | 5/1992 | | |
| EP | 0928704 B1 | 4/2004 | | |
| EP | 2261060 A2 | 12/2010 | | |
| EP | 2261060 A3 | 1/2011 | | |
| EP | 2492116 A2 | 8/2012 | | |
| EP | 2492116 A3 | 3/2013 | | |
| EP | 3045324 A1 * | 7/2016 | ......... | B60C 15/0045 |
| EP | 3368339 B1 | 4/2020 | | |
| FR | 2884762 A1 | 10/2006 | | |
| JP | S62163807 A | 7/1987 | | |
| JP | 2008296831 A | 12/2008 | | |
| WO | 2006/008876 A1 | 1/2006 | | |
| WO | 2009/010813 A1 | 1/2009 | | |
| WO | 2017/072708 A1 | 5/2017 | | |

OTHER PUBLICATIONS

Continental Motion Tire Set 120/70zr17 Front & 180/55zr17 Rear 180 55 17 120 70 17 2 Tire Set, https://www.amazon.com/CONTINENTAL-MOTION-70zr17-Front-55zr17/dp/B007N6RPSY/ref=sr_1_3?dchild=1&keywords=motorcycle+tire&qid=1585083457&s=automotive&sr=1-3, Mar. 21, 2012 (Year: 2012).*

Thumbertalk, List of Tire Weights https://thumpertalk.com/forums/topic/642184-list-of-tires-with-their-weight/ Jan. 16, 2009 (Year : 2009).*

Thread: Average weight of a wheel. (Oct. 31, 2008). Retrieved Jul. 20, 2020, from https://forums.mtbr.com/wheels-tires/average-weight-wheel-465403.html (Year: 2008).*

International Search Report and Written Opinion for International Application No. PCT/IB2016/056498 filed Oct. 28, 2016 on behalf of Pirelli Tyre S.P.A. dated Feb. 10, 2017. 11 pages.

Chinese Office Action for Chinese Application No. 201680067426.6 filed on Oct. 28, 2016 on behalf of Pirelli Tyre S.P.A. dated Oct. 28, 2019 18 pages (English + Original).

Second Office Action and Search Report for Chinese Application No. 201680067426.6 filed on Oct. 28, 2016 on behalf of Pirelli Tyre S.P.A. dated Jul. 30, 2020. CN Original + English Trans. 21 Pages.

Chinese Decision of Rejection for CN 201680067426.6 filed on Oct. 28,2016 on behalf of Pirelli Tyre S.P.A. dated Apr. 8, 2021. CN Original + Eng Trans. 16 Pages.

Dai Shu., et al., "Tianjin Huali Mini Car Structure and Service Maintenance" Golden Shield Publishing House, Jan. 1996. p. 250. CN + Eng Trans. 6 Pages.

Liang Shouzhi, et al., "Use and Maintenance of Tyres," *Tianjin Science and Technology Press* , May 1990. pp. 129-130. CN + Eng Trans. 8 Pages.

* cited by examiner

TYRE FOR BICYCLE WHEELS

CROSS REFERENCE TO RELATED APPLICATIONS

The present application is the U.S. National Stage of International Patent Application No. PCT/IB2016/056498 filed on Oct. 28, 2016 which, in turn, claims priority to Italian Application No. UB2015A005002 filed on Oct. 30, 2015 and Italian Application No. UA2016A005767 filed on Aug. 3, 2016.

The present invention relates to a tyre for bicycle wheels.

The tyre of the invention can be used in wheels for racing bicycles and in wheels for off-road bicycles.

In the present description and in the following claims, the following definitions apply.

The expression "racing bicycles" is used to refer to high-performance bicycles for racing on the road or on a track. Such bicycles include those that meet the regulations set by the International Cycling Union (UCI), recumbent bicycles, time trial and/or triathlon bicycles. It also includes the so-called "fitness bikes" (racing bikes for recreational use).

The expression "off-road bicycles" is used to refer to bicycles intended to travel on typically rough or irregular ground, i.e. grounds very different from one other and different from asphalt, like for example muddy, sandy, rocky, compact, soft ground etc. . . . Such bicycles include those that satisfy the regulations set by the International Cycling Union (UCI) and comprise in particular mountain bikes (MTB), all terrain bikes (ATB), BMXs, down-hill bikes, fat bikes, cyclo-cross bikes, trial bikes. On the other hand, high-performance bicycles for road or track competitions (so-called racing bicycles), recumbent bicycles, time trial and/or triathlon bicycles and so-called "fitness bikes" (racing bicycles for recreational use) are not included.

The expression "equatorial plane" of the tyre is used to indicate a plane perpendicular to the rotation axis of the tyre and that divides the tyre into two symmetrically equal parts.

The terms "radial" and "axial" and the expressions "radially inner/outer" and "axially inner/outer" are used with reference to a direction perpendicular and to a direction parallel to the rotation axis of the tyre, respectively.

The terms "circumferential" and "circumferentially" are used with reference to the direction of annular extension of the tyre, i.e. to the rolling direction of the tyre, which corresponds to a direction lying on a plane coinciding with or parallel to the equatorial plane of the tyre.

The expression "elastomeric material" is used to indicate a composition comprising at least one elastomeric polymer and at least one reinforcing filler. Preferably, such a composition further comprises additives like, for example, a cross-linking agent and/or a plasticizer. Thanks to the provision of the cross-linking agent, such a material can be cross-linked by heating.

The term "cord" or the expression "reinforcing cord" is used to indicate an element consisting of one or more thread-like elements (hereinafter also called "wires") possibly coated by, or incorporated in, a matrix of elastomeric material.

The expression "reinforced band-like element" is used to indicate an elongated product having, in a cross section thereof, a flat-shaped profile and comprising one or more reinforcing cords extending parallel to the longitudinal extension of the product and incorporated in, or at least partially coated by, at least one layer of elastomeric material. Such a reinforced band-like element is also commonly called "strip-like element".

The term "diameter" of a cord or of a wire is used to indicate the thickness of the cord or of the wire measured as prescribed by the method BISFA E10 (The International Bureau For The Standardization Of Man-Made Fibres, Internationally Agreed Methods For Testing Steel Tyre Cords, 1995 edition).

The expression "thread count" of a layer or of a ply or of a fabric is used to indicate the number of reinforcing cords per unit length provided in such a layer/ply/fabric. The thread count can be measured in TPI (threads per inch).

The expression "linear density" or "count" of a cord or of a wire is used to indicate the weight of the reinforcing cord per unit length. Linear density can be measured in dtex (grams per 10 km of length).

The expression "fitting diameter" of a tyre is used to indicate the diameter of the tyre measured at the inner diameter of the bead cores which anchor the tyre to the rim of the wheel, as prescribed in ETRTO (The European Tyre and Rim Technical Organization).

The expression "tread pattern" is used to indicate the representation of all of the points of the tread band on a plane perpendicular to the equatorial plane of the tyre and tangent to the maximum diameter of the tyre. The measurements of angles and/or linear quantities (distances, widths, lengths, etc. . . . ) and/or surfaces are to be understood as referred to the tread pattern as defined herein.

The term "width" of the tread band, is used to indicate, in the specific case of a tyre for off-road bicycle wheels, the width of the extension of the tread band on the aforementioned plane perpendicular to the equatorial plane of the tyre, considered between the axially outer edges of the axially outermost blocks.

The term "width" of a tyre is used to indicate the maximum axial extension of the tyre, measured according to the standard ETRTO. The width of the tyre corresponds to the width of the extension of the tyre on a plane perpendicular to the equatorial plane of the tyre and tangent to the maximum diameter of the tyre, such a width being measured between the axially outermost points of the tyre.

The expression "rolling resistance" is used to indicate the force that opposes the rolling of the tyre and, in more general terms, the energy consumed by the tyre during rolling per unit distance traveled. The measurement of the rolling resistance can be carried out according to standard ISO28580.

The expression "transversal curvature" of the tyre is used to indicate the curvature measured through a radius of curvature of a portion of the profile of a cross section of the tyre.

The expression "radius of curvature" of a portion of the profile of a cross section of the tyre is used to indicate the radius of the circumference that best approximates that profile portion.

The expression "top surfaces" of the blocks is used to indicate the radially outer surfaces delimited by the radially outer edges of the blocks.

The expression "void to rubber ratio" is used to indicate the complementary to the unit value of the ratio between the total of the top surfaces of the blocks of a predetermined portion of the tread pattern of the tyre (possibly of the entire tread pattern) and the total surface of said predetermined portion of tread pattern (possibly of the entire tread pattern).

Throughout the present description and in the following claims, when reference is made to certain values of certain angles, they are meant as absolute values, i.e. both positive and negative values with respect to a reference plane.

A tyre for bicycle wheels typically comprises a carcass structure turned around a pair of bead cores and a tread band arranged in radially outer position with respect to the carcass structure.

The carcass structure is configured to withstand the inflation pressure and to bear the weight of the bicycle and of the cyclist. It comprises one or more carcass plies, each comprising a plurality of suitably oriented reinforcing cords. In the case of many carcass plies, they are inclined with respect to one another to form a crossed structure.

The tread band is configured to ensure the adhesion of the tyre to the asphalt.

The bead cores have the task of ensuring the anchoring of the tyre to the rim of the wheel.

An air chamber in which pressurised air is introduced is typically provided in a radially inner position with respect to the carcass structure. However, types of tyres called "tubeless", i.e. without an air chamber, are known. In such tyres the pressurised air acts directly on the carcass structure. The latter and the rim of the wheel are configured so that their mutual anchoring ensures the airtight seal.

In order to avoid the penetration of debris in the carcass structure and, consequently, the perforation of the possible air chamber and/or the damaging of the carcass structure itself, a protective layer (hereinafter also referred to as "anti-perforation layer") is provided in a radially inner position with respect to the tread band. Such a protective layer can be arranged between the carcass plies (thus incorporated in the carcass structure) or be radially arranged between the carcass structure and the tread band and can comprise reinforcing cords of textile or metallic material suitably oriented or one or more layers of polymeric material.

Examples of tyres for bicycle wheels in which the protective layer is incorporated in the carcass structure are described in EP 0 484 831 and U.S. Pat. No. 4,649,979.

In particular, EP 0 484 831 describes a tyre for ATBs (all terrain bikes) and MTBs (mountain bikes). Such a tyre is intended to operate at inflation pressures equal to 3.5 or 4 bar. In such a tyre the carcass plies have a crossed orientation, with an angle of inclination comprised between 50° and 70° with respect to the circumferential direction. In an embodiment of the tyre, the protective layer is formed from a filament wound around a carcass ply and inclined by about 2° with respect to the circumferential direction.

U.S. Pat. No. 4,649,979 describes a tyre comprising a protective layer including reinforcing cords of textile or metallic material oriented circumferentially.

Examples of tyres in which the protective layer is radially interposed between the carcass structure and the tread band are described in US 2013/03122883 and FR 2884762.

In particular, US 2013/03122883 describes a tyre whose carcass structure comprises wires made of Kevlar and rubber composite material and whose the protective layer is made of a composite material comprising wires made of nylon (or equivalent material), reinforcing fillers and rubber.

FR 2884762 describes a tyre in which both the carcass structure (comprising two crossed carcass plies) and the protective layer comprise wires made of polyester polyarylate obtained from a molten liquid crystal polymer.

SUMMARY OF THE INVENTION

The Applicant has observed that when designing tyres for bicycle wheels it is necessary to consider many requirements which are interconnected with one another and in some cases conflicting with one another.

In particular, with reference to racing bicycles, the Applicant has observed that in order to limit as much as possible the physical effort that the cyclist needs to make while travelling, a tyre for racing bicycle wheels must have a low rolling resistance, i.e. a high smoothness. Since rolling resistance decreases as inflation pressure increases (for example due to the effect of the reduction of ground-contacting area of the tyre and/or the reduction of the deformation of the structure, with consequent lower heat dispersion in each rolling cycle of the tyre), it is necessary to foresee high inflation pressures.

The Applicant has thus worked on optimising the structure of the tyre for the use of high pressures.

To this end, the Applicant has considered that the increase in inflation pressure comes at the expense of other important performance features of the tyre, such as roadholding, i.e. the capability to maintain the trajectory when cornering, and comfort, i.e. the capability to absorb the undulations and the irregularities of the road surface. The worsening of roadholding as the inflation pressure increases is connected to the decreased ground-contacting area of the tyre, whereas the worsening of comfort as the inflation pressure increases is connected to the increase of the structural rigidity of the tyre.

Tyres for racing bicycle wheels need high roadholding at high speed, both in dry asphalt conditions and particularly in wet asphalt conditions, so as to reduce any risk of fall on the ground for the cyclist.

It is also advisable for such tyres to have high comfort, so as to reduce tiring of the cyclist during travel.

On the other hand, the provision of high inflation pressures, as well as being advantageous for the reduction of rolling resistance, is also favourable to the manoeuvrability of the bicycle. Indeed, an increase in the inflation pressure produces an increase in the structural rigidity of the tyre, i.e. a better ability of the tyre to not deform excessively under strain, to the great benefit of the riding performance in a straight line (precision of the trajectory, reactivity and control in traction and braking) and in cornering (resistance to lateral thrusts).

The Applicant has moreover observed that the provision of an anti-perforation layer tends to worsen the rolling resistance and comfort since it increases the structural rigidity of the tyre.

On the other hand, a light covering improves the general performance also since it reduces the size of the suspended masses and improves the perception of manoeuvrability.

The Applicant has considered how to optimise the rolling resistance of the tyre without at the same time worsening the roadholding and the comfort and at the same time ensuring the desired ridability and protection against perforation.

The Applicant has observed that in order to optimise the rolling resistance of a tyre for racing bicycle wheels it is advantageous, in addition to properly choose the compound of the tread band, to properly design the structural components that are arranged in a radially inner position with respect to the tread band. Indeed, only selecting an optimised compound with respect to the rolling resistance would inevitably lead to accepting a compromise with respect to roadholding.

With reference to the structural components arranged in a radially inner position with respect to the tread band, the Applicant has guessed that in order to optimise the rolling resistance without worsening the other performance features it is advantageous to evaluate (since the rolling resistance improves as inflation pressure increases) both the influence exerted by the high inflation pressure on each of such performance features and the role carried out by the various structural components of the tyre with respect to each of the aforementioned performance features, so as to make each structural component of the tyre with the aim of maximising the performance feature most influenced by such a structural component.

In this respect, the Applicant has observed that an important task carried out by the carcass structure is that of withstanding the high inflation pressure and bearing the weight of the bicycle and of the cyclist.

The Applicant has verified that such a task is carried out in an optimal manner by a radial carcass structure or by a carcass structure provided with reinforcing cords inclined, with respect to the equatorial plane of the tyre, by an angle not lower than 65°, preferably not lower than 70°. Indeed, the orientation of the reinforcing cords in this case is such as to ensure the same resistance to the radially inner and outer stresses along the entire axial and circumferential extension of the tyre.

The Applicant has, however, considered that as the inflation pressure increases, the ground-contacting area of the tyre reduces, with negative repercussions on the roadholding and on the ridability, and has guessed that in order to avoid such negative consequences it is advisable to provide, in a radially outer position with respect to the carcass structure, at least one belt layer made to keep the geometry and the curvature profile of the tyre unchanged as the inflation pressure increases.

In this respect, the Applicant has found that a belt layer comprising cords wound on the crown portion of the carcass structure according to a circumferential winding direction (at zero degrees) or inclined, with respect to the equatorial plane of the tyre, by an angle lower than about 30°, being substantially inextensible in the radial direction as the inflation pressure increases, makes it possible both to keep the geometry and the curvature profile of the carcass structure unchanged and to keep the position of the tread band with respect to the carcass structure unchanged, thus avoiding the possibility of relative movements occurring between tread band and carcass structure during travel. Such movements would indeed lead to an undesired dissipation of kinetic energy, thus being disadvantageous with respect to the rolling resistance. In practice, according to the Applicant, the use of a belt layer of the type described above makes it possible to maintain a stable behaviour of the crown portion of the tyre as the inflation pressure changes, with consequent maintaining of the profile and of the ground-contacting area of the tyre, to the great benefit of the roadholding and ridability.

The Applicant has also observed that a belt layer as described above, since it does not impede the deformation of the axially outer portions of the carcass structure under the vertical stresses which the tyre is subjected to when it passes over a rough patch or an undulation of the road surface, provides the carcass structure with a flexibility such as to ensure a high comfort.

Moreover, the reinforcing cords of such a belt layer, having a big difference in angle of inclination with respect to the reinforcing cords of the carcass structure, define together with the reinforcing cords of the carcass structure a woven structure capable of effectively opposing the perforation and/or penetration of debris in the carcass structure.

With reference to off-road bicycles, the Applicant has observed that, in order to maximise the performance of a tyre for off-road bicycles, it is advisable to maximise its adhesion to the ground. High adhesion indeed makes it possible to have better grip on the ground and, therefore, better traction, ridability, directionality and braking during manoeuvres, which are very often quick and sudden, to which an off-road bicycle is typically subjected to, particular going uphill or downhill.

In order to increase adhesion it is typically possible to provide for a block tread band, i.e. a tread band comprising a plurality of blocks suitably spaced apart so as to be able to deeply penetrate into the ground in order to provide traction and to easily drain possible mud or dirt trapped between one block and the adjacent one.

In order to increase adhesion it is also possible to increase the ground-contacting area of the tyre.

The Applicant has observed that it is possible to increase the ground-contacting area by reducing, the dimensions of the tyre being equal, its inflation pressure. This, however, results in a series of drawbacks that the Applicant wishes to avoid.

A first drawback is the greater risk of the bead of the tyre coming out from the anchoring seat suitably provided on the rim of the wheel. Such a risk is high due to the continuous lateral stresses to which the tyre is typically subjected to on rough or irregular ground.

Another drawback is the greater risk of perforation and/or cutting of the tyre, both of breaking the carcass structure by banging with the rim of the wheel, and of damaging and/or breaking the rim itself because of the contact of the tyre with possible bodies (like for example stones, rocks, nails, pins, roots etc. . . . ) laying on, or projecting from, the ground (hereinafter, for the sake of simplicity reference will be made as an example to a stone).

A further drawback is the lower riding and manoeuvring precision perceived by the cyclist on very rough ground, particularly downhill and at high speed, and the lower smoothness perceived by the cyclist on less rough ground.

The Applicant has also observed that it is possible to increase the ground-contacting area, the same inflation pressure being equal, by increasing the dimensions of the tyre, in particular its width and/or its diameter. Also in this case, however, there would be some drawbacks that the Applicant wishes to avoid.

A first drawback is an increase of weight of the tyre and, consequently, of the effort the cyclist has to make during pedalling on the flat and uphill. The increased weight also results in less manoeuvrability and riding precision going downhill and at high speed, due to the greater gyroscopic and inertia effects to which the wheel is subjected to.

A further drawback is the need to provide for bicycle frames specially designed for such wheels of greater width and/or diameter.

The Applicant has considered how maximising the ground-contacting area of a tyre for off-road bicycle wheels without the need to reduce the inflation pressure and increase the dimensions of the tyre, so as not to encounter the drawbacks discussed above.

The Applicant has observed that it is possible to achieve this task by adequately arranging the structural components that are arranged in a radially inner position with respect to the tread band.

In particular, the Applicant has found that in order to obtain a substantial increase of the ground-contacting area, the inflation pressure and dimensions of the tyre being equal, it is advantageous to provide, in a radially inner position with respect to the tread band, an internal structure that is sufficiently flexible both in the axial direction and in the circumferential direction, so as to allow the tyre, upon contacting a stone, to deform axially and circumferentially so as to envelop, or incorporate, such a stone inside the profile of the tyre, in this way preventing portions of tyre axially and circumferentially adjacent to that engaged by the aforementioned stone from being lifted from the ground, thus losing adhesion.

The Applicant has found that it is possible to obtain the desired flexibility and/or deformation capability of the internal structure of the tyre by providing a radial carcass structure, or a carcass structure provided with reinforcing cords inclined, with respect to the equatorial plane of the tyre, by an angle not lower than 65°, preferably not lower than 70°, and, in a radially outer position with respect to the carcass structure, a belt layer at zero degrees, or provided with reinforcing cords wound on the crown portion of the carcass structure according to a circumferential winding direction or oriented, with respect to the equatorial plane of the tyre, at an angle lower than about 30°.

The Applicant has indeed found that the orientation of the reinforcing cords in the aforementioned carcass structure makes it possible to obtain a high flexibility of the tyre at the opposite sidewalls thereof and, consequently, a high capability of the tyre to deform around a possible stone without losing the contact between the portions of tyre axially adjacent to that engaged by the aforementioned stone and the ground.

The Applicant has also found that the orientation of the reinforcing cords in the aforementioned belt layer makes it possible to not impede the axial deformation of the carcass structure and to allow the tyre, during rolling, to incorporate such a possible stone inside the profile of the tyre itself, in this way maintaining the contact with the ground also at the portions of tyre circumferentially adjacent to that engaged by the aforementioned stone.

Advantageously, a belt layer that is substantially inextensible in the radial direction allows the tyre to maintain the geometry and the curvature profile of design both upon inflation and during rolling, to the benefit of roadholding and ridability.

Moreover, the reinforcing cords of the aforementioned belt layer, having a big difference in angle of inclination with respect to the reinforcing cords of the carcass structure, define together with the reinforcing cords of the carcass structure a woven structure capable of effectively opposing perforation and/or penetration of debris in the carcass structure.

According to the Applicant, therefore, a tyre for off-road bicycle wheels having such features possesses a ground-contacting area larger than that of conventional tyres, the inflation pressure and dimensions of the tyres being equal. It is therefore possible to maintain the inflation pressure and the dimensions of the tyre on standard values.

Maintaining the inflation pressure on standard values results in a lower risk of the bead of the tyre coming out from the anchoring head suitably provided on the rim of the wheel, a lower risk of perforation and/or cutting of the tyre, and a lower risk of damaging the carcass structure and/or the rim of the wheel.

Maintaining the dimensions of the tyre on standard values allows the use of standard frames and makes it possible both to contain the weight of the tyre and, therefore, the effort the cyclist has to make to move the bicycle, and to improve riding manoeuvrability and precision.

Therefore, in a first aspect thereof, the present invention relates to a tyre for racing or off-road bicycle wheels, comprising:
  a carcass structure;
  at least one belt layer arranged in a radially outer position with respect to the carcass structure;
  a tread band arranged in a radially outer position with respect to the belt layer.

Preferably, the carcass structure comprises at least one carcass ply engaged, at the axially opposite end edges thereof, with a pair of annular anchoring structures and including a plurality of reinforcing cords inclined, with respect to an equatorial plane of the tyre, by a first angle comprised between about 65° and about 90°, more preferably between about 70° and about 90°, the extreme values being included.

Preferably, said at least one belt layer comprises at least one reinforcing cord wound on the carcass structure according to a winding direction oriented, with respect to said equatorial plane, at a second angle comprised between about 0° and about 30°, the extreme values being included.

In the case of a tyre for off-road bicycle wheels, the tread band comprises a plurality of blocks and has a void to rubber ratio preferably equal to at least 60%, more preferably equal to at least 70%, for example equal to about 75%.

In a second aspect thereof, the invention relates to a bicycle wheel, comprising a rim and a tyre of the type described above, in which said tyre is mounted on said rim and is inflated to a predetermined pressure.

In first embodiments, said tyre is a tyre for racing bicycle wheels and said predetermined pressure is greater than, or equal to, about 5 bar, preferably greater than, or equal to, about 6 bar, more preferably greater than, or equal to, about 7 bar.

In second embodiments, said tyre is a tyre for off-road bicycle wheels and said predetermined pressure is greater than, or equal to, about 1 bar, more preferably greater than, or equal to, about 1.5 bar.

Preferably, in the case of a tyre for off-road bicycle wheels, said predetermined pressure is lower than, or equal to, about 4.5 bar, more preferably lower than, or equal to, about 4 bar, even more preferably lower than, or equal to, about 3.5 bar.

In preferred embodiments, in the case of a tyre for off-road bicycle wheels, said predetermined pressure is comprised between about 1 bar and about 4.5 bar, preferably between about 1.5 bar and about 4 bar, even more preferably between about 1.5 bar and about 3.5 bar.

The present invention can, in at least one of the aforementioned aspects, have at least one of the following preferred features, taken individually or in combination with any one of the other preferred features described.

Apart from when expressly stated otherwise, the features discussed below apply both to a tyre according to the invention for racing bicycle wheels and to a tyre according to the invention for off-road bicycle wheels.

In a first embodiment, said at least one reinforcing cord of said at least one belt layer is wound in a helix on the carcass structure according to said winding direction.

In an alternative embodiment, said at least one belt layer comprises a plurality of parallel reinforcing cords each of which is wound on the carcass structure according to said winding direction.

Preferably, said second angle is comprised between about 0° and about 5°, the extreme values being included.

More preferably, said winding direction is substantially circumferential, i.e. said second angle is substantially equal to about 0°.

Preferably, said at least one belt layer has a width smaller than the width of the tyre.

More preferably, the width of said at least one belt layer is more than 20% of the width of the tyre, more preferably more than 30% of the width of the tyre, even more preferably more than 40% of the width of the tyre.

More preferably, the width of said at least one belt layer is lower than 80% of the width of the tyre, more preferably lower than 70% of the width of the tyre, even more preferably lower than 65% of the width of the tyre.

Preferably, the reinforcing cords of said at least one carcass ply are made of a textile material, so as to limit as much as possible the weight of the tyre.

Preferably, the reinforcing cord(s) of said at least one belt layer is/are made of a textile material.

Even more preferably, the reinforcing cords of the carcass structure and of said at least one belt layer are made of the same textile material.

In a first embodiment of the tyre, the carcass structure comprises a single carcass ply. Hereinafter, such a tyre is also indicated as "single-ply tyre".

In a second embodiment of the tyre, the carcass structure comprises a first carcass ply including a first plurality of reinforcing cords inclined, with respect to said equatorial plane, by said first angle and a second carcass ply arranged in a radially outer position with respect to the first carcass ply and including a second plurality of reinforcing cords inclined, with respect to said equatorial plane, by said first angle on the opposite side to said first plurality of cords, so as to define a crossed carcass structure, preferably a two-ply carcass structure. Hereinafter, such a tyre is also indicated as "two-ply tyre".

In alternative embodiments, the carcass structure can comprise more than two carcass plies, each carcass ply being arranged so as to define a crossed structure with the adjacent radially inner carcass ply, in a totally identical manner to what has been described above with reference to the first and second carcass plies.

In other embodiments (not illustrated), for example intended for tyres for particularly long races or on particularly irregular surfaces (cobbled, unasphalted roads), it is also possible to provide for further reinforcing plies arranged axially between the beads, preferably radially between the carcass plies.

Preferably, in the case of a single-ply tyre, said first angle is preferably greater than about 70°, more preferably greater than about 80°, even more preferably equal to about 90°.

Preferably, in the case of a "two-ply" tyre, said first angle is comprised between about 75° and about 90°, the extreme values being included.

In order to further improve the behaviour of the tyre in terms of rolling resistance, the Applicant has also observed that it is advantageous to provide the various layers of the tyre with a high thread count of reinforcing cords. A high thread count moreover results in a lower weight (due to the greater number of threads per unit length, which in turn results in a smaller amount of elastomeric material in the layer considered and a lower thickness of such a layer) and greater comfort (due to the greater flexibility of the wires).

In the case of a tyre for racing bicycle wheels, preferably, the single carcass ply (in the case of a single-ply tyre), or each of the carcass plies (in the case of a tyre with two or more carcass plies), has a thread count greater than, or equal to, about 15 TPI, more preferably greater than, or equal to, about 30 TPI, even more preferably greater than, or equal to, about 60 TPI, even more preferably, greater than, or equal to, about 120 TPI.

In the case of a tyre for racing bicycle wheels, preferably, the single carcass ply (in the case of a single-ply tyre), or each of the carcass plies (in the case of a tyre with two or more carcass plies), has a thread count lower than, or equal to, about 360 TPI, more preferably lower than, or equal to, about 300 TPI, even more preferably lower than, or equal to, about 240 TPI, even more preferably lower than, or equal to, about 200 TPI.

In the case of a tyre for off-road bicycle wheels, preferably, the single carcass ply (in the case of a single-ply tyre), or each of the carcass plies (in the case of a tyre with two or more carcass plies), has a thread count greater than, or equal to, about 15 TPI, more preferably greater than, or equal to, about 30 TPI.

In the case of a tyre for off-road bicycle wheels, preferably, the single carcass ply (in the case of a single-ply tyre), or each of the carcass plies (in the case of a tyre with two or more carcass plies), has a thread count lower than, or equal to, about 120 TPI, more preferably lower than, or equal to, about 90 TPI.

It is preferable that, in the case of a two-ply tyre (or with more than two carcass plies), the second carcass ply (or at least another carcass ply) has a thread count substantially identical to that of the first carcass ply.

The Applicant has found that, with the angles and the thread counts discussed above, the behaviour of a two-ply tyre (or with more than two carcass plies) is substantially comparable with that of a single-ply tyre.

Preferably, said at least one belt layer has a thread count greater than, or equal to, about 15 TPI, more preferably greater than, or equal to, about 30 TPI.

Preferably, said at least one belt layer has a thread count lower than, or equal to, about 360 TPI, more preferably lower than, or equal to, about 300 TPI.

In order to further improve the behaviour of the tyre in terms of rolling resistance, particularly in the case of a tyre for racing bicycle wheels, the Applicant has also observed that it is advantageous to suitably select the diameter and the linear density of the reinforcing cords used in the various layers of the tyre. Such parameters indeed influence the structural rigidity, and therefore the stability of shape and geometry, and consequently both the rolling resistance and the comfort. Such parameters obviously also influence the weight and, with respect to the diameter, the thickness of the layer comprising the reinforcing cords.

Preferably, the reinforcing cords of the single carcass ply (in the case of a single-ply tyre) or of each carcass ply (in the case of a two-ply tyre or with more than two carcass plies) have a diameter lower than, or equal to, about 0.55 mm, more preferably lower than, or equal to, about 0.35 mm.

Preferably, the reinforcing cords of the single carcass ply (in the case of a single-ply tyre) or of each carcass ply (in the case of a two-ply tyre or with more than two carcass plies) have a diameter greater than, or equal to, about 0.10 mm, more preferably greater than, or equal to, about 0.12 mm.

Preferably, the reinforcing cord(s) of said at least one belt layer has/have a diameter lower than, or equal to, about 0.55 mm, more preferably lower than, or equal to, about 0.35 mm.

Preferably, the reinforcing cord(s) of said at least one belt layer has/have a diameter greater than, or equal to, about 0.10 mm, more preferably greater than, or equal to, about 0.12 mm.

It is preferable for the reinforcing cord(s) of said at least one belt layer to have a diameter substantially identical to that of the reinforcing cords used in the carcass structure.

Preferably, the reinforcing cords of the single carcass ply (in the case of a single-ply tyre) or of each carcass ply (in the case of a two-ply tyre or with more than two carcass plies)

have a linear density greater than, or equal to, about 110 dtex, more preferably greater than, or equal to, about 230 dtex.

Preferably, the reinforcing cords of the single carcass ply (in the case of a single-ply tyre) or of each carcass ply (in the case of a two-ply tyre or with more than two carcass plies) have a linear density lower than, or equal to, about 1300 dtex, more preferably lower than, or equal to, about 940 dtex.

Preferably, the reinforcing cord(s) of said at least one belt layer has/have a linear density greater than, or equal to, about 110 dtex, more preferably greater than, or equal to, about 230 dtex.

Preferably, the reinforcing cord(s) of said at least one belt layer has/have a linear density lower than, or equal to, about 1300 dtex, more preferably lower than, or equal to, about 940 dtex.

In particularly preferred embodiments of the tyre, the same type of reinforcing cord is used both in the carcass structure and in said at least one belt layer.

Preferably, in the case of a tyre for racing bicycle wheels, the tyre has a weight lower than about 350 g, preferably lower than, or equal to, about 250 gr.

Preferably, in the case of a tyre for off-road bicycle wheels, the tyre has a weight greater than, or equal to, about 300 g, more preferably greater than, or equal to, about 350 g.

Preferably, in the case of a tyre for off-road bicycle wheels, the tyre has a weight lower than, or equal to, about 2 Kg, more preferably lower than, or equal to, about 1.5 Kg, even more preferably lower than, or equal to about 750 g, even more preferably lower than, or equal to, about 650 g.

In preferred embodiments, in the case of a tyre for off-road bicycle wheels, the tyre has a weight comprised between about 300 g and about 2 Kg, more preferably between about 350 g and about 1.5 Kg, more preferably between about 350 g and about 750 g, more preferably between about 350 g and about 650 g, the extreme values being included.

Said at least one carcass ply can comprise opposite end edges joined head-to-head at said at least one reinforcing layer (i.e. below the reinforcing layer), or at least partially overlapping one another at the reinforcing layer, or be axially spaced apart from one another. In this last case, the end edges can be positioned below the reinforcing layer or be in different axial positions from that of the reinforcing layer. In the case of a two-ply tyre, both the carcass plies can have the respective opposite end edges with identical mutual arrangement, or one of the carcass plies can have a mutual arrangement of its end edges different from that of the other carcass ply. In this last case, a preferred configuration is the one in which the end edges of the radially innermost carcass ply are axially spaced apart from one another and in different axial positions from that of the reinforcing layer, whereas the end edges of the radially outermost carcass ply are joined head-to-head at said at least one reinforcing layer (i.e. below the reinforcing layer).

DESCRIPTION OF THE FIGURES AND OF PREFERRED EMBODIMENTS

Further features and advantages of the tyre of the present invention will become clearer from the following detailed description of some preferred embodiments thereof, made with reference to the attached drawings. In such drawings.

Figure 1:
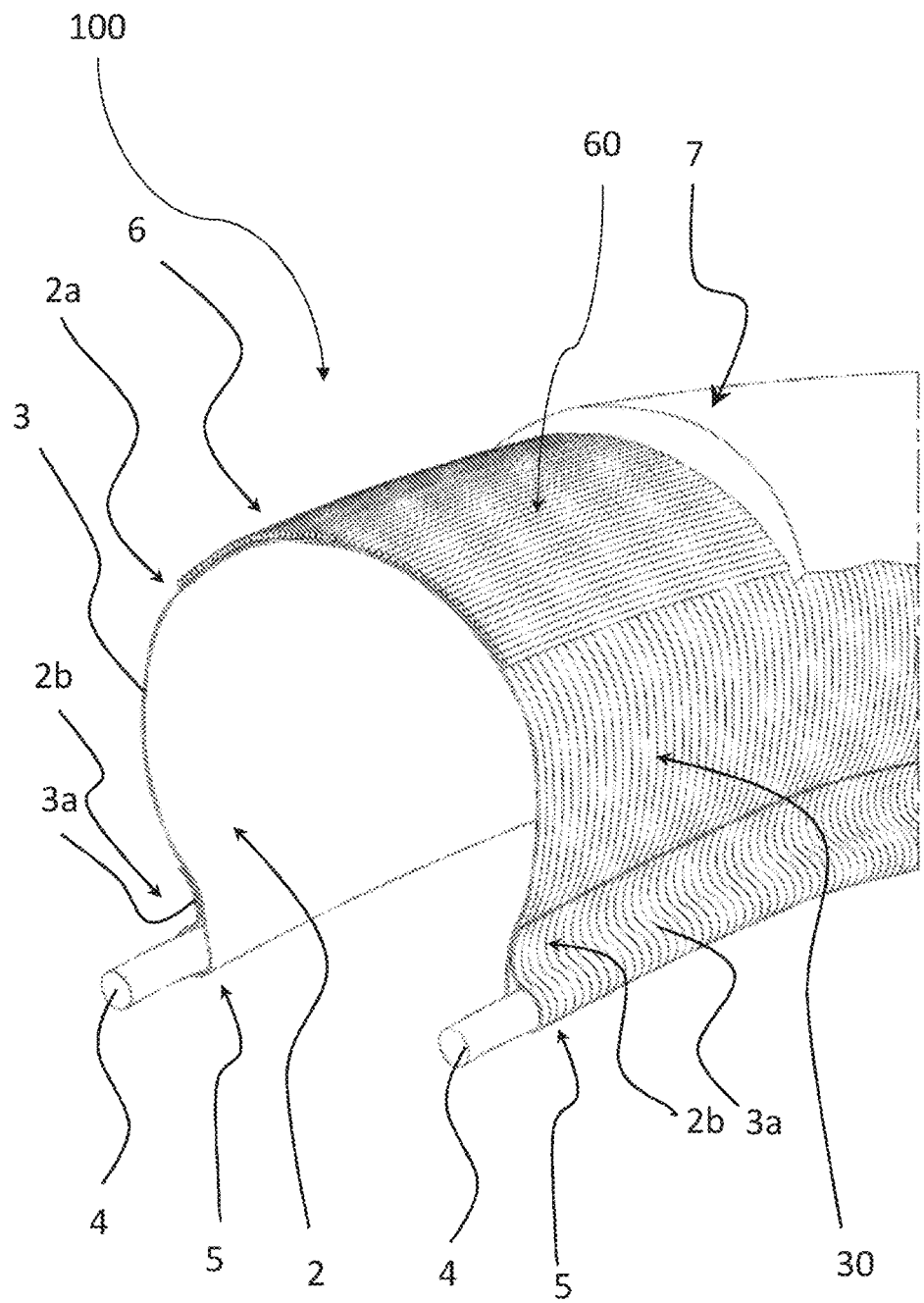
FIG. 1 is a schematic perspective view of a tyre in accordance with a first preferred embodiment of the present invention.
Figure 2:
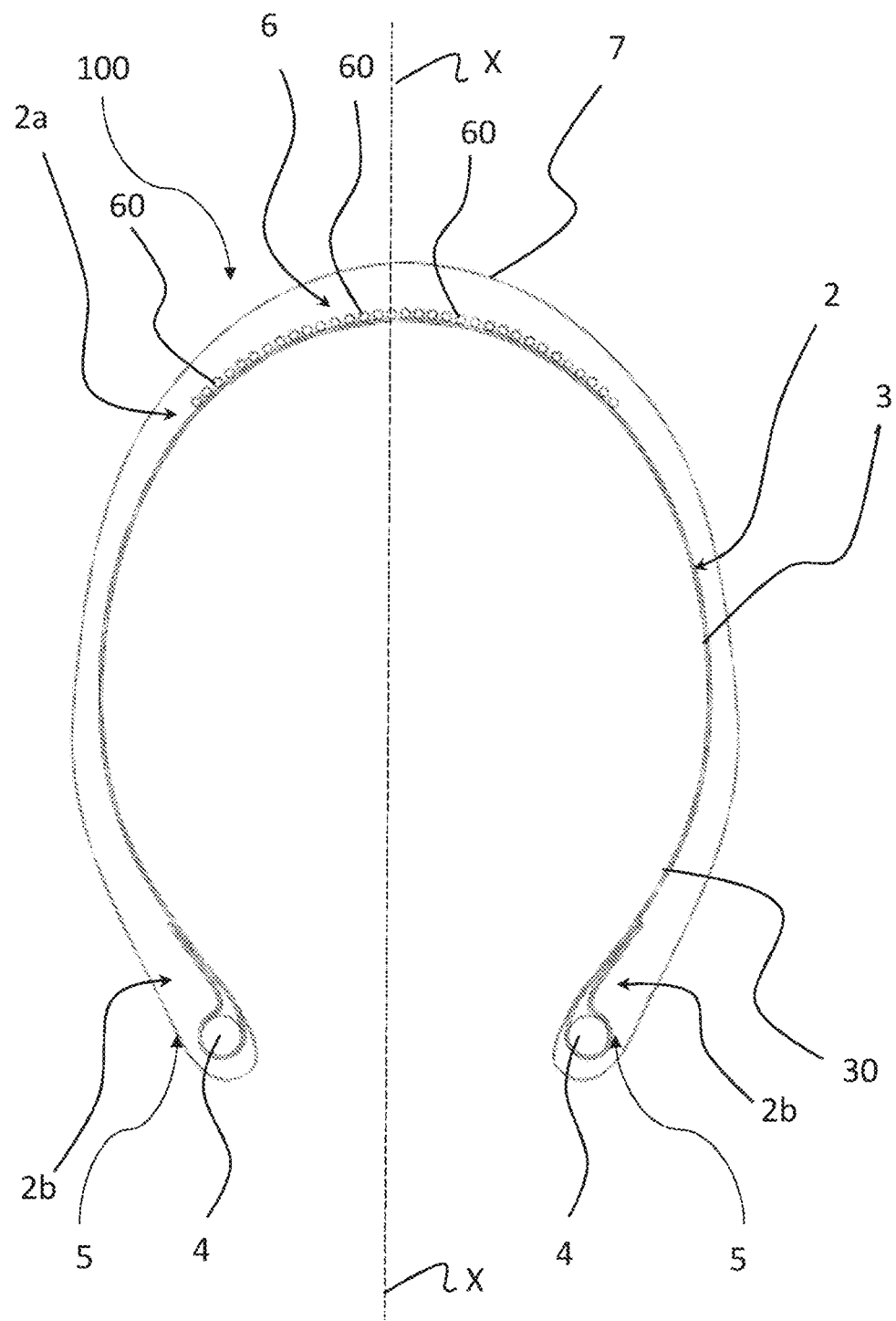
FIG. 2 is a schematic axial section view of the tyre of FIG. 1.
Figure 3:
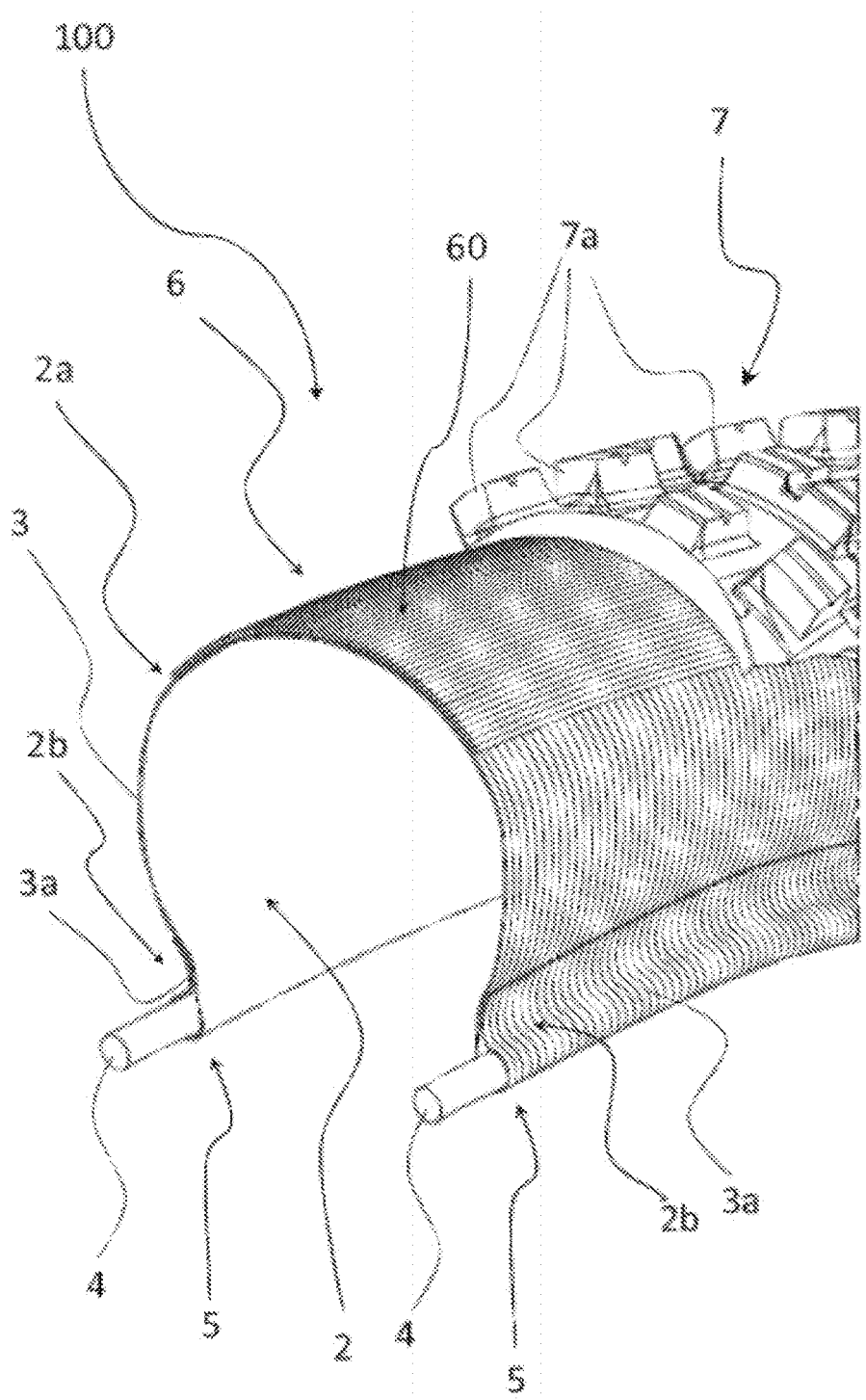
FIG. 3 is a schematic perspective view of a tyre in accordance with a second preferred embodiment of the present invention.
Figure 4:
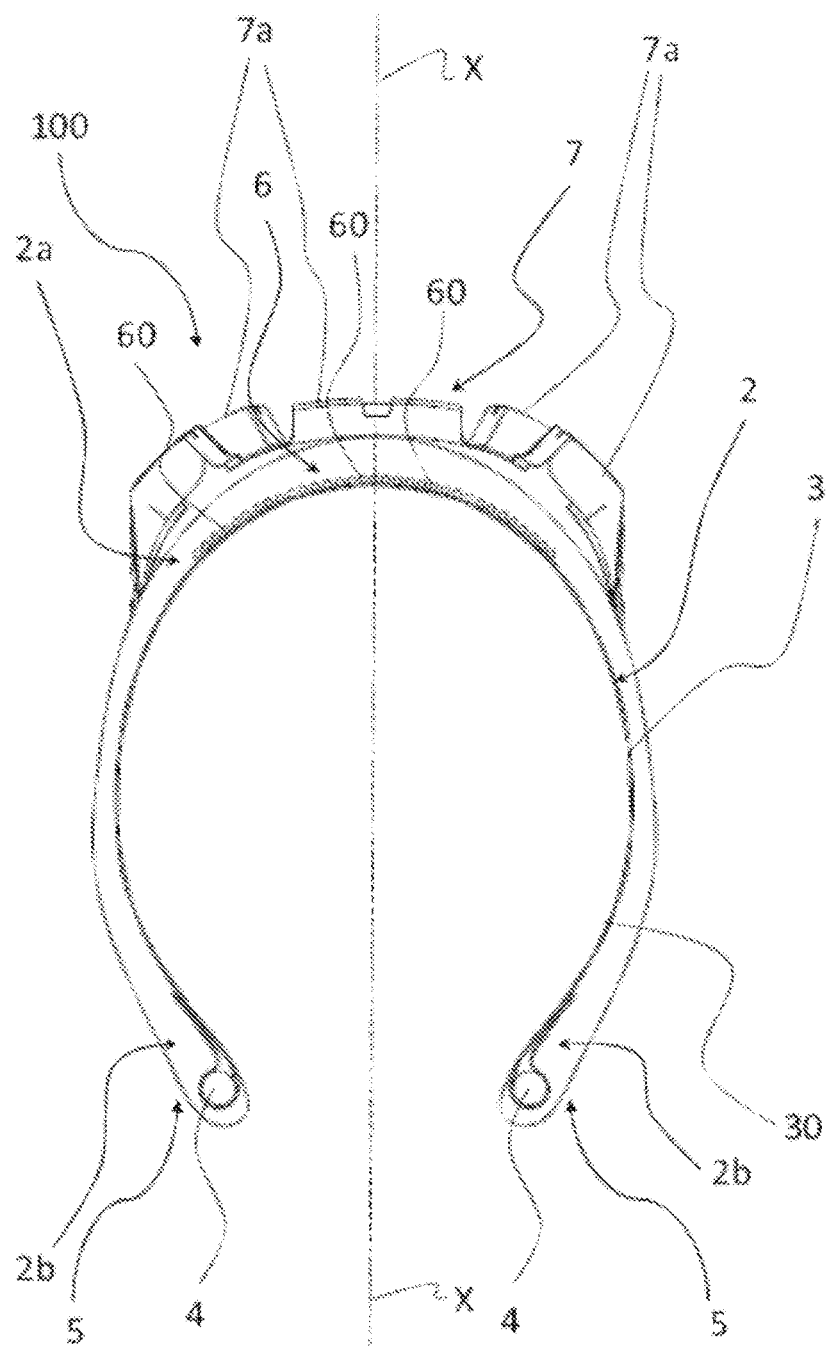
FIG. 4 is a schematic axial section view of the tyre of FIG. 3.

In FIGS. 1 and 4, reference numeral 100 wholly indicates a tyre for bicycle wheels according to the present invention. In particular, FIGS. 1 and 2 show a tyre configured to be mounted on the wheels of a racing bicycle, whereas FIGS. 3 and 4 show a tyre configured to be mounted on the wheels of an off-road bicycle.

In the tyre 100 an equatorial plane X-X (FIGS. 2 and 4) and a rotation axis (not illustrated) perpendicular to the equatorial plane X-X are defined. Moreover, an axial (or transversal or lateral) direction, parallel to the rotation axis and a circumferential (or longitudinal) direction parallel to the equatorial plane X-X and corresponding to the rolling direction of the tyre 100 are also defined.

The tyre 100 of FIGS. 1-4, once inflated, has a substantially toroidal configuration.

Figure 10:
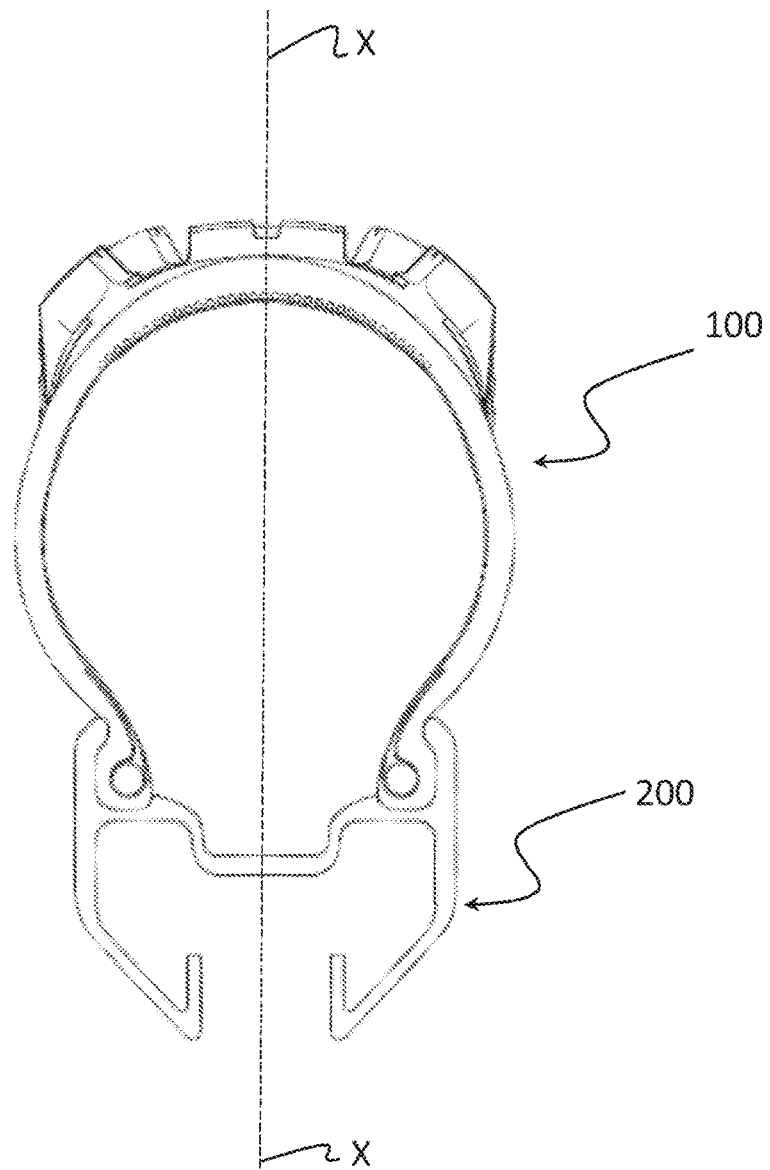
FIG. 10 is a schematic axial section view of the tyre of FIG. 3 mounted on a rim of a bicycle wheel.

FIG. 10 shows, as an example, the tyre 100 of FIG. 3 mounted on a rim 200 of a bicycle wheel.

Once mounted on the rim 200, the tyre 100 of FIGS. 1 and 2 is inflated to a pressure greater than or equal to about 5 bar, more preferably greater than or equal to about 6 bar, even more preferably greater than or equal to about 7 bar, whereas the tyre 100 of FIGS. 3 and 4 is inflated to a pressure comprised between a minimum value equal to about 1 bar and a maximum value equal to about 4.5 bar, preferably comprised between about 1.5 bar and about 4 bar, even more preferably comprised between 1.5 bar and 3.5 bar, the extreme values being included.

The tyre 100 of FIGS. 1-4 comprises a carcass structure 2 comprising a crown portion 2*a* symmetrically arranged with respect to the equatorial plane X-X and opposite side portions 2*b* arranged on axially opposite sides to the crown portion 2*a*.

In the embodiment illustrated in the attached drawings, the carcass structure 2 comprises a single carcass ply 3 (single-ply tyre). However, alternative embodiments are provided (like for example those schematised in FIGS. 8 and 9) in which the carcass structure 2 comprises many carcass plies, preferably two (two-ply tyre).

What is described below with reference to the carcass ply illustrated in the drawings applies both to the single carcass ply of the single-ply tyre and to each carcass ply of the two-ply tyre, except when explicitly stated otherwise.

The carcass ply 3 extends axially from a side portion 2*b* of the carcass structure 2 to the opposite side portion 2*b*.

The carcass ply 3 is engaged, at the respective axially opposite end edges 3*a* thereof, with respective annular anchoring structures 4, typically called "bead cores".

Each end edge 3*a* of the carcass ply 3 is turned around a respective bead core 4.

In an alternative embodiment, not shown, the carcass ply has the axially opposite end edges thereof associated, without being turned, with the annular anchoring structures, provided with two annular inserts. A filler made of elastomeric material can be arranged in an axially outer position with respect to the first annular insert. The second annular insert, on the other hand, is arranged in an axially outer position with respect to the end of the carcass layer. Finally, in an axially outer position with respect to said second annular insert, and not necessarily in contact with it, a further filler that finishes the annular anchoring structure can be provided.

The bead cores 4 are preferably made of textile fibres having high elastic modulus, like for example aramid fibres (common name of aromatic polyamide fibres) or wires made of metal, like for example steel.

On the outer perimeter edge of the bead cores 4 a tapered elastomeric filler can be applied that occupies the space defined between the carcass ply 3 and the respective turned end edge 3a.

The area of the tyre comprising the bead core 4 and the possible elastomeric filler forms the so-called "bead", globally indicated in FIG. 1 with 5, intended for anchoring the tyre, through elastically forced fitting, on a corresponding mounting rim, not shown.

Figure 5:
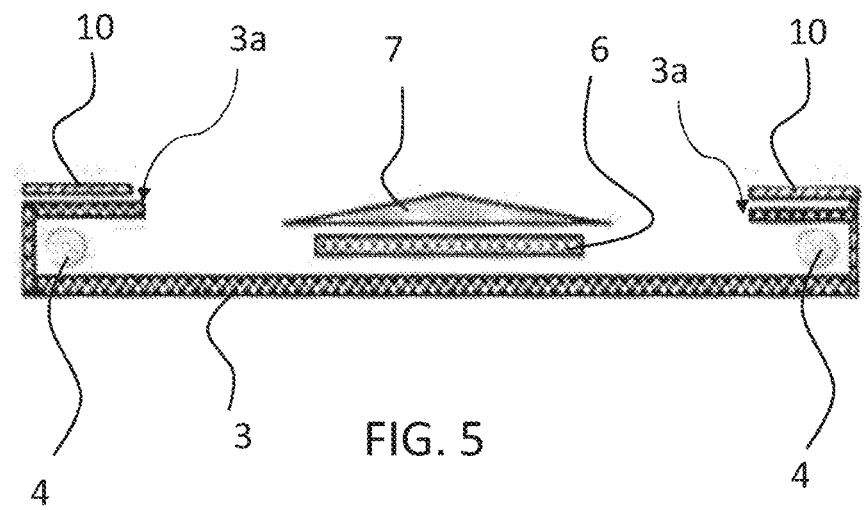
FIGS. 5-9 show possible schematic constructive diagrams representative of alternative embodiments of the tyre of the invention.

A reinforced band-like element 10 can be applied on the turned end edge 3a of the carcass ply 3, at each bead 5, as shown in FIGS. 3-5. Such a reinforced band-like element 10 is arranged between the carcass ply 3 and the rim of the wheel when the tyre is mounted on such a rim.

Instead of the reinforced band-like element 10 a single reinforcing cord can be used, deposited possibly after a tackifying treatment.

A belt layer 6, described hereinafter in greater detail, is provided in a radially outer position with respect to the aforementioned carcass structure 2, at the crown portion 2a.

A tread band 7, by means of which the tyre 100 makes contact with the road surface, is provided in a radially outer position with respect to the belt layer 6.

The tyre 100 of FIGS. 1 and 2 has an axial dimension (here also indicated as "axial extension" or "width") preferably comprised between about 19 mm and about 38 mm, more preferably between about 19 mm and about 32 mm, even more preferably between about 23 mm and about 28 mm, the extreme values being included.

The tyre 100 of FIGS. 1 and 2 has an outer diameter (expressed in inches according to the Angle-Saxon naming) preferably comprised between about 24 inches and about 29 inches, more preferably comprised between about 26 inches and about 29 inches, the extreme values being included. Correspondingly, the fitting diameter according to the ISO or E.T.R.T.O. convention is preferably equal to about 559 mm (which corresponds to an outer diameter of 26 inches for mountain bikes), or equal to about 571 mm (which corresponds to an outer diameter of 26 inches for road racing bicycles), or equal to about 584 mm (which corresponds to an outer diameter of 27.5 inches for mountain bikes), or equal to about 622 mm (which corresponds to an outer diameter of 28 inches for road racing bicycles and to an outer diameter of 29 inches for mountain bikes) or equal to about 630 mm (which corresponds to a particular outer diameter of 27 inches for road racing bicycles).

For example, a first embodiment of the tyre 100 of FIGS. 1 and 2 has an outer diameter equal to 26 inches, a second embodiment has an outer diameter equal to 28 inches, and a third embodiment has an outer diameter equal to 29 inches.

The tyre 100 of FIGS. 3 and 4 has an axial dimension preferably comprised between about 37 mm and about 120 mm, the extreme values being included.

The tyre 100 of FIGS. 3 and 4 has an outer diameter preferably comprised between about 26 inches and about 29 inches, the extreme values being included. Correspondingly, the fitting diameter according to the ISO or E.T.R.T.O. convention is preferably comprised between about 559 mm and about 622 mm.

For example, a first embodiment of the tyre 100 of FIGS. 3 and 4 has an outer diameter equal to 26 inches (fitting diameter equal to 559 mm), a second embodiment has an outer diameter equal to 27.5 inches (fitting diameter equal to 584 mm) and a third embodiment has an outer diameter equal to 29 inches (fitting diameter equal to 622 mm).

The tyre 100 of FIGS. 1-4 has a high transversal curvature.

Preferably, in the crown portion 2a of the tyre 100 of FIGS. 1 and 2 the radius of curvature of the tyre 100 is comprised between 10 mm and 18 mm, more preferably between 12 mm and 15 mm, the extreme values being included, whereas in the side portions 2b the radius of curvature is comprised between 15 mm and 30 mm, more preferably between 20 mm and 25 mm. For example, the radius of curvature in the crown portion 2a can be equal to about 13 mm and the radius of curvature in the side portions 2b can be equal to about 25 mm.

Preferably, in the crown portion 2a of the tyre 100 of FIGS. 3 and 4 the radius of curvature of the tyre 100 is comprised between 15 mm and 50 mm, more preferably between 25 mm and 35 mm, the extreme values being included, whereas in the side portions 2b the radius of curvature is comprised between 15 mm and 60 mm, more preferably between 30 mm and 40 mm, the extreme values being included. For example, the radius of curvature in the crown portion 2a can be equal to about 30 mm and the radius of curvature in the side portions 2b can be equal to about 35 mm.

The carcass ply 3 of the tyre 100 of FIGS. 1-4 is preferably made of elastomeric material and comprises a plurality of reinforcing cords 30 arranged substantially parallel to one another. For the sake of clarity of illustration, in FIG. 1 reference numeral 30 is associated with the whole of reinforcing cords shown.

The reinforcing cords 30 are preferably made of a textile material selected from Nylon, Rayon, PET, PEN, Lyocell, Aramid, or combinations thereof, in one or more threads, preferably 1 or 2 threads.

The reinforcing cords 30 have a diameter preferably comprised between about 0.10 mm and about 0.55 mm, more preferably between about 0.12 mm and about 0.35 mm, the extreme values being included, for example equal to about 0.13 mm.

The reinforcing cords 30 have a linear density comprised between about 110 dtex and about 1300 dtex, more preferably between about 230 dtex and about 940 dtex, the extreme values being included, for example equal to about 470 dtex.

Specific examples of textile materials that can be used for the aforementioned reinforcing cords are as follows:

Nylon 930 dtex/1
Nylon 470 dtex/1
Nylon 230 dtex/1
Aramid 470/1 wherein the number 1 after dtex indicates the number of threads.

The reinforcing cords 30 can nevertheless be made of steel, in which case they have a diameter preferably comprised between 0.10 mm and 0.175 mm, the extreme values being included.

The reinforcing cords 30 are inclined, with respect to the equatorial plane of the tyre 100, by an angle comprised between about 65° and about 90°, the extreme values being included.

Preferably, in the case of a single-ply tyre, the aforementioned angle is greater than about 70°, more preferably greater than about 80°, even more preferably equal to about 90°. In this last case the reinforcing cords 30 lie on respective planes perpendicular to the rotation axis, thus defining a radial carcass structure.

On the other hand, in the case of a two-ply tyre, a first carcass ply includes a plurality of reinforcing cords inclined, with respect to the equatorial plane of the tyre, by an angle preferably comprised between about 75° and about 90°, the extreme values being included, and a second carcass ply, arranged in a radially outer position with respect to the first carcass ply, includes a second plurality of reinforcing cords inclined by the same angle, with respect to said equatorial plane, on the opposite side with respect to the reinforcing cords of the first carcass ply. In this last case the reinforcing cords lie on respective planes inclined with respect to the rotation axis Z, thus defining a crossed carcass structure.

The carcass ply 3 of the tyre 100 of FIGS. 1 and 2 preferably has a thread count comprised between about 15 TPI and about 360 TPI, more preferably between about 30 TPI and about 300 TPI, the extreme values being included, for example equal to about 240 TPI.

Preferably, in the case of a two-ply tyre, each carcass ply has a thread count comprised between about 15 TPI and about 200 TPI, more preferably between about 30 TPI and about 180 TPI, the extreme values being included, for example equal to about 120 TPI.

The carcass ply 3 of the tyre 100 of FIGS. 3 and 4 preferably has a thread count comprised between about 15 TPI and about 120 TPI, more preferably between about 30 TPI and about 90 TPI.

Preferably, in the case of a two-ply tyre or with more than two carcass plies, each carcass ply has a thread count comprised between about 15 TPI and about 120 TPI, more preferably between about 30 TPI and about 90 TPI.

The tyre 100 shown in FIGS. 1-4 comprises a single belt layer 6, but alternative embodiments can be provided comprising more than one belt layer.

The belt layer 6 extends axially on the crown portion 2a of the carcass structure 2 for a section of predetermined width.

Preferably, such a width is lower than the width of the tyre 100. More preferably, in the tyre 100 of FIGS. 1 and 2 such a width is comprised between 20% and 80% of the width of the tyre 100, even more preferably between 30% and 70% of the width of the tyre 100, even more preferably between 40% and 65% of the width of the tyre 100, the extreme values being included, whereas in the tyre 100 of FIGS. 3 and 4 such a width is comprised between 30% and 90% of the width of the tyre 100, even more preferably between 40% and 80% of the width of the tyre 100, even more preferably between 60% and 70% of the width of the tyre 100, the extreme values being included.

For example, in a tyre 100 for racing bicycle wheels having axial dimensions comprised between 19 and 38 mm, the width of the belt layer 6 is equal to at least 8 mm. Preferably, such a width is lower than 24 mm.

For example, in a tyre 100 for off-road bicycle wheels having axial dimensions comprised between 50 mm and 70 mm, the width of the belt layer 6 is equal to at least 20 mm. Preferably, such a width is lower than 60 mm.

In a preferred embodiment of the tyre 100 of FIGS. 1-4, the belt layer 6 is formed by winding in a helix, in the axial direction, on the crown portion 2a of the carcass structure 2 a single reinforcing cord 60, according to a winding direction oriented, with respect to the equatorial plane X-X, at an angle comprised between about 0° and about 30°, the extreme values being included, to form a plurality of coils 60a. For the sake of clarity of illustration, in FIGS. 1 and 3 reference numeral 60 is associated with the whole of the reinforcing cords of the belt layer 6, whereas in FIGS. 2 and 4 it is only associated with some of the reinforcing cords of the belt layer 6.

The reinforcing cord 60 can be coated with, or incorporated in, an elastomeric material.

In an alternative embodiment of the tyre 100 (not shown), the belt layer can be formed by winding in a helix on the crown portion 2a of the carcass structure 2, according to the aforementioned winding direction, a reinforced band-like element comprising a plurality of parallel reinforcing cords.

In both of the embodiments described above, the winding pitch is preferably constant.

In a further embodiment of the tyre 100 (not shown), the belt layer is formed by winding in the circumferential direction on the crown portion 2a of the carcass structure 2 a strip of elastomeric material comprising a plurality of parallel reinforcing cords each of which is oriented according to the aforementioned winding direction. The end edges of such a strip may or may not partially overlapped.

Preferably, the winding angle of the reinforcing cord 60 or of the reinforced band-like element of elastomeric material (or the angle of inclination of the reinforcing cords of the strip of elastomeric material) with respect to the equatorial plane X-X is equal to about 0°, i.e. the reinforcing cord 60 is wound in a substantially circumferential direction, thus defining a zero degrees belt layer.

What is described below with reference to the reinforcing cord 60 is also valid for the reinforcing cords of the belt layer of the aforementioned alternative embodiments or of possible further alternative embodiments of the tyre 100 of FIGS. 1-4.

The reinforcing cord 60 is preferably made of a textile material selected from Nylon, Rayon, PET, PEN, Lyocell, Aramid, or metallic material, or combinations thereof, in one or more threads, preferably 1 or 2 threads.

The reinforcing cord 60 has a diameter preferably comprised between about 0.10 mm and about 0.55 mm, more preferably between about 0.12 mm and about 0.35 mm, the extreme values being included, for example equal to about 0.13 mm.

The reinforcing cord 60 has a linear density comprised between about 110 dtex and about 1300 dtex, more preferably between about 230 dtex and about 940 dtex, the extreme values being included, for example equal to about 470 dtex.

Preferably, the reinforcing cord 60 is totally identical to the reinforcing cords 30 used in the carcass structure 2.

The belt layer 6 preferably has a thread count comprised between about 15 TPI and about 360 TPI, more preferably between about 30 TPI and about 300 TPI, the extreme values being included, in the tyre 100 of FIGS. 1 and 2 (for example equal to about 240 TPI) and between about 30 TPI and about 120 TPI, the extreme values being included, in the tyre 100 of FIGS. 3 and 4 (for example equal to about 60 TPI).

The tread band 7 is made of a compound of elastomeric material preferably comprising at least one elastomeric diene polymer.

The tread band 7 extends axially on the belt layer 6 for a section of width that can be lower than or at least equal to that of the belt layer 6. The particular structural configuration of the carcass structure 2 and of the belt layer 6 ensure that the tyre 100 is very light. Indeed, the weight of the tyre 100 of FIGS. 1 and 2 is lower than about 350 g, preferably lower than, or equal to, about 250 g, whereas the weight of the tyre 100 of FIGS. 3 and 4 is lower than about 750 g, preferably lower than, or equal to, about 650 g.

With reference to the tyre 100 of FIGS. 1 and 2, the configuration of the carcass structure 2 and of the belt layer 6 ensures high stability of the shape and of the ground-contacting area of the tyre 100 at the high inflation pressures at which the tyre 100 is preferably intended to work, to the benefit of smoothness (low rolling resistance) and without penalising roadholding, comfort and ridability. In particular, it is possible to provide for high inflation pressures thanks to the provision of a substantially radial carcass structure 2, to the benefit of smoothness, and it is possible to ensure good flexibility to radial loads and a sufficiently large ground-contacting area, also at such high pressures, thanks to the provision of a substantially circumferential belt layer 6, to the benefit of roadholding, ridability and comfort. The reticulate structure defined by the substantially radial carcass structure 2 and by the substantially circumferential belt layer 6 also ensures high performance against perforation.

Preferably, the manufacturing of the tyre 100 takes place by depositing the carcass ply 3 on a substantially cylindrical forming support. Before building the belt layer 6 on the carcass ply 3, the central portion of the forming support is curved so as to approach the desired configuration of the belt layer 6 at the end of vulcanization. Such a provision makes it possible to minimise the inevitable differences in pull (and consequently in deformation) that occur between axially central portion and opposite side portions of the belt layer 6. Such differences in pull indeed result in an undesired relative movement between carcass structure 2 and belt layer 6, with consequent dissipation of energy during rolling and, therefore, reduction of smoothness of the tyre 100. Moreover, the aforementioned provision makes it possible to use, for the belt layer 6, reinforcing cords made of textile materials that are more rigid and having high performance, like aramid or certain hybrid materials.

In the tyre 100 of FIGS. 3 and 4, the tread band 7 comprises a plurality of blocks 7a.

The tread band 7 has a void to rubber ratio equal to at least 60%, more preferably equal to at least 70%, for example equal to about 75-80%.

The blocks 7a preferably have a height comprised between about 2 mm and about 5 mm, the extreme values being included.

In the lightest and most radially compact embodiment thereof, the tyre 100 of FIGS. 1 and 2 and the tyre 100 of FIGS. 3 and 4 is in accordance with the constructive scheme of FIG. 5. In this case, the end edges 3a of the carcass ply 3 are axially spaced apart from one another and are in different axial positions from that of the belt layer 6. In the specific example of FIG. 5, on the turned end edge 3a of the carcass ply 3 the reinforced band-like element 10 is applied, which however may not be provided.

Figure 6:
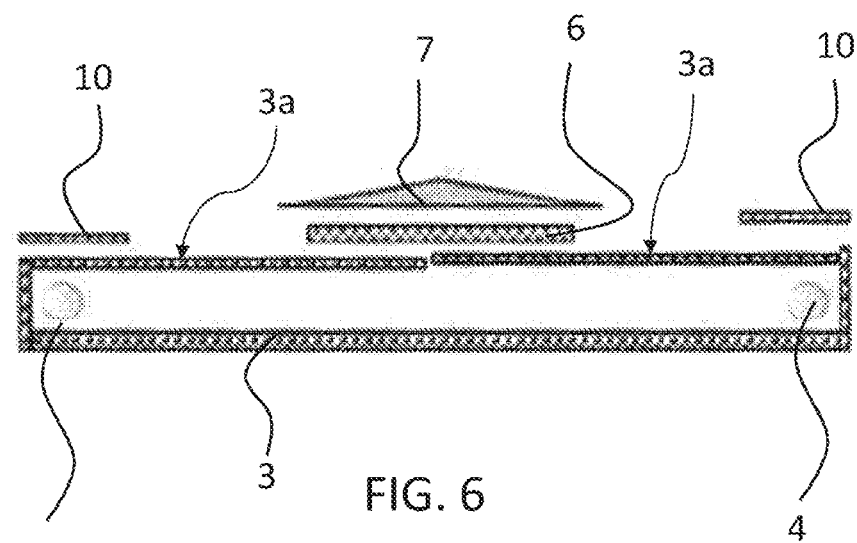
Figure 7:
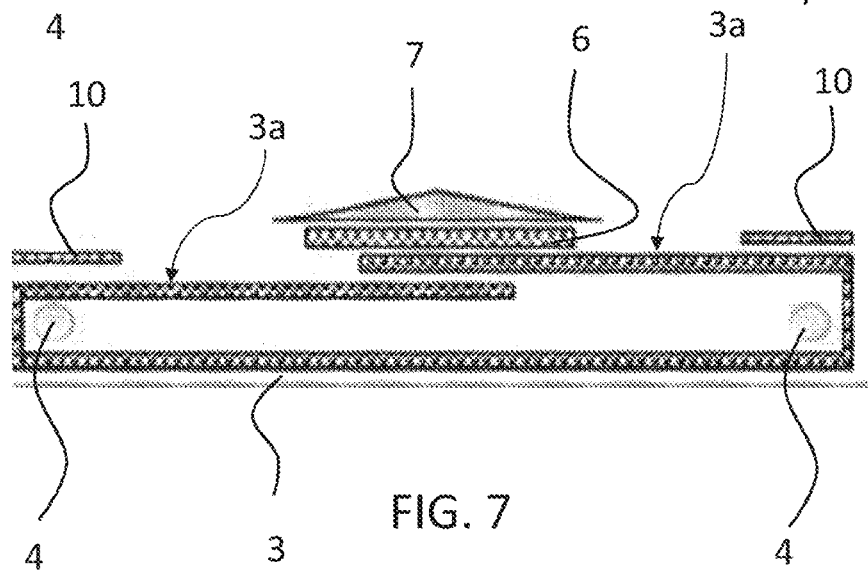

FIGS. 6 and 7 schematically show possible alternative embodiments of a single-ply tyre in accordance with the present invention.

Such embodiments differ from that of FIG. 5 solely in that the end edges 3a of the carcass ply 3 are joined head-to-head at the belt layer 6 (FIG. 6), or are partially overlapped to one another at the belt layer 6 (FIG. 7).

In the embodiments of FIGS. 5-7, on the turned end edge 3a of the carcass ply 3 the reinforced band-like element 10 is applied.

Figure 8:
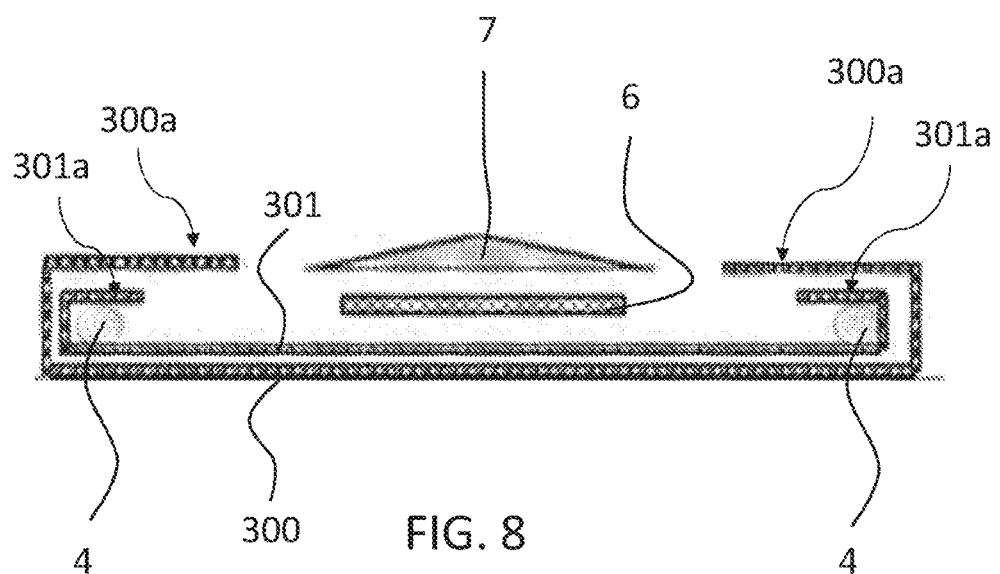
Figure 9:
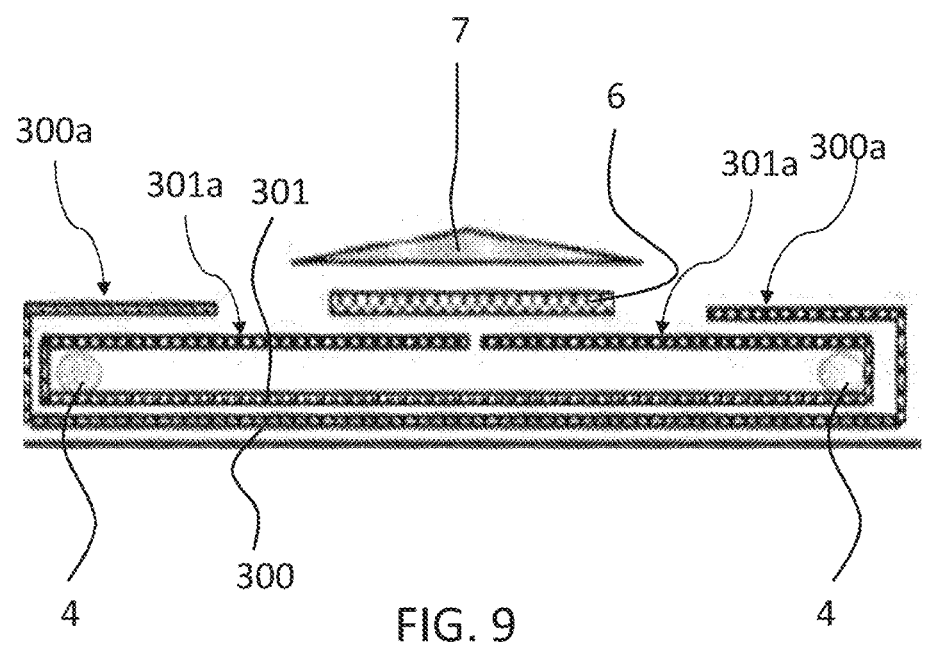

FIGS. 8 and 9 schematically show possible embodiments of a two-ply tyre in accordance with the present invention.

In the embodiment of FIG. 8, both the carcass plies 300, 301 have the respective opposite end edges 300a, 301a turned around the bead cores 4, axially spaced apart from one another and in axial positions different from that of the belt layer 6. In the embodiment of FIG. 9, on the other hand, the end edges 300a of the radially innermost carcass ply 300 are axially spaced apart from one another and in axial positions different from that of the belt layer 6, whereas the end edges 301a of the radially outermost carcass ply 301 are joined head-to-head at the belt layer 6.

The present invention has been described with reference to some preferred embodiments. Different modifications can be made to the embodiments described above, in any case remaining within the scope of protection of the invention, which is defined by the following claims.

The invention claimed is:

1. A bicycle tyre, comprising:
    a carcass structure;
    a single belt layer arranged in a radially outer position with respect to the carcass structure; and
    a tread band arranged in a radially outer position with respect to the single belt layer,
        wherein the carcass structure comprises at least one carcass ply engaged, at axially opposite end edges thereof, with a pair of annular anchoring structures and including a plurality of reinforcing cords inclined, with respect to an equatorial plane of the tyre, at a first angle comprised between about 65° and about 90°, inclusive,
        wherein said single belt layer comprises at least one reinforcing cord wound on the carcass structure according to a winding direction oriented, with respect to said equatorial plane, at a second angle comprised between about 0° and about 30°, inclusive,
        wherein the plurality of the reinforcing cords of the carcass structure are identical to the at least one reinforcing cord of the single belt layer by being made of a same textile material and by having an identical diameter, and
        wherein the tyre is a racing bicycle wheels tyre and has a weight lower than 350 g or an off-road bicycle wheels tyre and has a weight lower than, or equal to, 650 g.

2. The bicycle tyre according to claim 1, wherein said at least one reinforcing cord of said single belt layer is wound in a spiral on the carcass structure according to said winding direction.

3. The bicycle tyre according to claim 1, wherein said single belt layer comprises a plurality of parallel reinforcing cords, each reinforcing cord being wound on the carcass structure according to said winding direction.

4. The bicycle tyre according to claim 1, wherein said winding direction is substantially circumferential.

5. The bicycle tyre according to claim 1, wherein said single belt layer has a width smaller than the width of the tyre.

6. The bicycle tyre according to claim 5, wherein the width of said single belt layer is comprised between 20% and 80% of the width of the tyre.

7. The bicycle tyre according to claim 1, wherein the reinforcing cords of said carcass structure are made of a textile material.

8. The bicycle tyre according to claim 1, wherein said at least one reinforcing cord of said single belt layer is made of a textile material.

9. The bicycle tyre according to claim 1, wherein the carcass structure comprises a single carcass ply and said first angle is equal to about 90°.

10. The bicycle tyre according to claim 9, wherein said single carcass ply has a thread count comprised between about 15 TPI and about 360 TPI, inclusive.

11. The bicycle tyre according to claim 1, wherein the carcass structure comprises a first carcass ply including a first plurality of reinforcing cords inclined, with respect to said equatorial plane, at said first angle and a second carcass ply arranged in a radially outer position with respect to the first carcass ply and including a second plurality of reinforcing cords inclined, with respect to said equatorial plane, at said first angle on the opposite side to said first plurality of reinforcing cords.

12. The bicycle tyre according to claim 11, wherein said first angle is comprised between about 75° and about 90°, inclusive.

13. The bicycle tyre according to claim 11, wherein each of said first carcass ply and second carcass ply has a thread count comprised between about 15 TPI and about 360 TPI, inclusive.

14. The bicycle tyre according to claim 1, wherein said single belt layer has a thread count comprised between about 15 TPI and about 360 TPI, inclusive.

15. The bicycle tyre according to claim 1, wherein the reinforcing cords of the carcass structure have a diameter comprised between about 0.10 mm and about 0.55 mm, inclusive.

16. The bicycle tyre according to claim 1, wherein said at least one reinforcing cord has a diameter comprised between about 0.10 mm and about 0.35 mm, inclusive.

17. The bicycle tyre according to claim 1, wherein said tyre is an off-road bicycle wheels tyre and said tread band comprises a plurality of blocks and has a void to rubber ratio equal to at least 60%.

18. The bicycle tyre according to claim 17, wherein said blocks have a height greater than or equal to about 2 mm.

19. The bicycle tyre according to claim 1, wherein said tyre is an off- road bicycle wheels tyre and has a weight greater than, or equal to, about 300 g.

20. A bicycle wheel, comprising a rim and the bicycle tyre according to claim 1 mounted on the rim, wherein said tyre is a racing bicycle wheels tyre and is inflated to a pressure greater than, or equal to, about 5 bar.

21. A bicycle wheel, comprising a rim and the bicycle tyre according to claim 1 mounted on the rim, wherein said tyre is an off-road bicycle wheels tyre and is inflated to a pressure greater than, or equal to, about 1 bar and lower than, or equal to, about 4.5 bar.

22. The bicycle wheel according to claim 21, wherein said pressure is greater than, or equal to, about 1.5 bar and lower than, or equal to, about 4 bar.

23. The bicycle tyre according to claim 1, wherein the carcass structure comprises al least one carcass ply being limited to a single carcass ply.

* * * * *